US010667087B2

(12) United States Patent
Lindoff et al.

(10) Patent No.: US 10,667,087 B2
(45) Date of Patent: May 26, 2020

(54) BACKHAUL FOR ACCESS POINTS ON HIGH SPEED TRAINS

(71) Applicant: Telefonaktiebolaget LM Ericsson (publ), Stockholm (SE)

(72) Inventors: Bengt Lindoff, Bjarred (SE); Joakim Axmon, Kavlinge (SE); Bryan Smith, Raa (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 504 days.

(21) Appl. No.: 15/045,192

(22) Filed: Feb. 16, 2016

(65) Prior Publication Data

US 2017/0238141 A1 Aug. 17, 2017

(51) Int. Cl.

*H04W 24/02* (2009.01)
*H04W 4/02* (2018.01)
*G01S 19/42* (2010.01)
*H04B 7/06* (2006.01)
*H04B 7/08* (2006.01)

(52) U.S. Cl.

CPC ............ *H04W 4/027* (2013.01); *G01S 19/42* (2013.01); *H04B 7/0608* (2013.01); *H04B 7/0802* (2013.01); *H04B 7/0834* (2013.01); *H04W 24/02* (2013.01)

(58) Field of Classification Search

CPC ..... G01S 19/42; H04B 7/0608; H04B 7/0802; H04B 7/0834; H04W 24/02; H04W 4/027; H04W 4/046

See application file for complete search history.

(56) References Cited

U.S. PATENT DOCUMENTS

2005/0059387 A1 3/2005 Lardennois et al.
2010/0297937 A1* 11/2010 Kim .................... H04B 7/1555 455/11.1

(Continued)

FOREIGN PATENT DOCUMENTS

AU 4041595 B 3/1999
CN 101771455 A 7/2010

(Continued)

OTHER PUBLICATIONS

PCT International Search Report, dated Apr. 11, 2017, in connection with International Application No. PCT/EP2017/053368, all pages.

(Continued)

*Primary Examiner* — Lester G Kincaid
*Assistant Examiner* — Dung L Lam
(74) *Attorney, Agent, or Firm* — Leffler Intellectual Property Law, PLLC; Kenneth B. Leffler

(57) ABSTRACT

Reception and transmission from at least two sets of antenna ports on a high speed train are controlled, wherein the at least two sets of antenna ports are installed at different locations on the high speed train. This involves determining a velocity and the position of each of the antenna ports, and using these as a basis for determining a reception combining scheme and/or transmission scheme from the sets of antenna ports. Signals are transmitted and received from the sets of antenna ports in conformance with the determined reception combining and/or transmission scheme.

21 Claims, 9 Drawing Sheets

(56) References Cited

U.S. PATENT DOCUMENTS

| | | | | |
|---|---|---|---|---|
| 2010/0311424 | A1 * | 12/2010 | Oga | H04B 1/7113 455/440 |
| 2014/0198715 | A1 | 7/2014 | Zasowski | |
| 2015/0131618 | A1 | 5/2015 | Chen | |

FOREIGN PATENT DOCUMENTS

| | | | |
|---|---|---|---|
| CN | 102811083 | A | 12/2012 |
| CN | 104202275 | A | 12/2014 |
| EP | 0718986 | A2 * | 12/1995 |
| EP | 0718986 | A2 | 6/1996 |
| EP | 2242312 | A1 | 10/2010 |
| WO | 2009061136 | A2 | 5/2009 |

OTHER PUBLICATIONS

PCT Written Opinion, dated Apr. 11, 2017, in connection with International Application No. PCT/EP2017/053368, all pages.

3GPP TSG RAN Meeting #66, RP-141849, Maui, Hawaii (US), Dec. 8-12, 2014, Motivation of New SI proposal: Performance enhancements for high speed scenario, 4 pages.

3GPP TSG RAN Meeting #66, RP-142307, Maui, Hawai (US), Dec. 8-12, 2014, NTT Docomo, Inc., Huawei, HiSilicon, “New SI proposal: Performance enhancements for high speed scenario”, 7 pages.

* cited by examiner

Scenario1
Dedicated network

Scenario2
DC or CA based

Scenario3
Public network with repeater

Scenario4
Dedicated network with repeater

BACKHAUL FOR ACCESS POINTS ON HIGH SPEED TRAINS

BACKGROUND

The present invention relates to connectivity between high-speed trains and network nodes of a cellular communications system.

Operators of cellular communications systems who have invested in deployments of networks along high-speed train corridors have found that the achievable system capacity is significantly limited by the User Equipment (UE) performance. Consequently, strategies for improving the downlink system capacity for communication between network nodes and UEs on high-speed trains have been studied for some time by affected organizations, such as the standardization body known as 3rd Generation Partnership Project (3GPP). Four exemplary network deployments for serving a high-speed train were identified by operators and described in 3GPP TSG RAN Meeting #66, RP-141849, "Motivation of New SI proposal: Performance enhancements for high speed scenario" (Maui, Hi. (US), Dec. 8-12, 2014). These exemplary scenarios are depicted in FIGS. 1A, 1B, 1C, and 1D and described in the following.

FIG. 1A shows "Scenario1", in which a dedicated network is deployed along the railway. Examples include Remote Radio Head (RRH) (or other antenna node) deployments. Separate carriers, f1 and f2, are utilized for the dedicated and public networks, respectively. By sharing the same Cell Identifier (ID) among multiple RRHs, the handover success rate can be increased to some extent.

FIG. 1B shows "Scenario2", in which separate carriers are utilized. One carrier, f2, has good coverage and serves as a Primary Cell (PCell) for mobility management (control). Another carrier, f1, at high frequency is deployed along the railway and provides good data transmission. Carrier Aggregation (CA) or Dual Carrier (DC) could be applied.

FIG. 1C shows "Scenario3", in which a public network is deployed along the railway and repeaters are installed in train carriages. With repeaters, the signal quality can be improved, although the penetration loss is large.

FIG. 1D shows "Scenario4", in which a dedicated network, using for example frequency f1, is deployed along the railway, and repeaters are installed in train carriages. A public network using another frequency, for example f2, serves other UEs that are not onboard the train.

In addition to the scenarios described above, another scenario involves using Access Points (AP) onboard high-speed trains. The Access Point offers UEs onboard the train to connect via a local network (e.g., 3G/4G pico cells or WiFi) and establishes a wireless backhaul link to the Radio Access Network (RAN). From the point of view of the Radio Access Network (RAN), the AP aggregates multiple users into a single one, with benefits including, for example, reduction of handover-related signaling overhead. Moreover, an AP-based solution allows UEs to save power since the penetration loss through the walls of the carriage can be avoided, thereby allowing the UEs to use lower transmission power.

The current communication standard has partly taken UE speeds up to 300 km/h into account, but only for the data demodulation part; for cell detection only 40 km/h has been considered. With increased deployment of high speed train lines, number of UEs and machine-type communication (MTC) devices, and increased usage of bandwidth per user, dominating operators are requesting improved UE downlink performance for speeds up to and exceeding 350 km/h.

The inventors of the subject matter described herein have considered that, depending on relative movement of a UE to a transmitting site, the received signal may display a significant Doppler shift. The Doppler shift forces the UE to increase its demodulation frequency when moving towards the cell, and decrease it when moving away from the cell, the increases/decreases being relative to the carrier frequency used in the network. The magnitude of the Doppler shift depends on the relative velocity of the UE towards the transmitting antenna. If the transmitting antennas are placed close to the track, the angle between the trajectory of the UE and the line between the UE and the transmitting antennas will be small. Consequently, a substantial part of the UE's velocity will contribute to a Doppler shift. Moreover, there will be an abrupt change of sign of the Doppler shift when the UE passes the transmitting antenna, and the smaller the angle, the more abrupt the change is.

Given an angle, α, between a first vector representing the trajectory of the train (and hence also the UE) in Euclidean three-dimensional space and a second vector (also in Euclidean three-dimensional space) between the train and the transmitting antenna, the Doppler shift can be expressed as $$\Delta f = f\left(\sqrt{\frac{1-\frac{v}{c}}{1+\frac{v}{c}}}-1\right)$$

where c is the speed of light and ν is the relative velocity of the UE (essentially the same as the velocity of the train) towards the transmitting antenna. With an angle α as discussed above and UE velocity, $v_{UE}$, the relative velocity towards the transmitting antenna giving rise to Doppler shift is $v=v_{UE}\cos\alpha$.

The inventors further note that, if an AP-based solution is employed, and assuming that the AP can provide a stable frequency reference, the Doppler shift will only be experienced on the backhaul link and hence not by the UEs. Thus, the Doppler shift can be dealt with by the AP without requiring any special technology in the UEs for this purpose.

There is therefore an advantage to employing an AP-based solution in high-speed train scenarios. However, the inventors have recognized the existence of a number of problems with conventional approaches. The achievable system capacity depends on the performance of the wireless backhaul link between the AP and the RAN. In particular deployment scenarios such as Scenario1, referred to as Bidirectional Single Frequency Network (SFN) deployment, the performance of the backhaul link is degraded by fading and inter-carrier interference caused by receiving the same signal from two directions simultaneously and with opposite Doppler shifts.

Bidirectional SFN has already been deployed along high-speed train corridors by dominant operators, and they have found that the achieved system throughput is not nearly as good as expected. As a consequence, it may take longer time to get a return on investments, and the end-user experience may be bad. It has been proposed in 3GPP RAN4 to define a high-speed enabled UE category having an improved receiver to mitigate the system capacity loss. This will however not lead to improved capacity as long as the bulk of the UEs are legacy terminals. The reason is that those terminals will consume the available capacity by their use of redundancy (robust encoding) and retransmissions.

Since investments on the network infrastructure already have been made, it is important to find ways of mitigating the low downlink performance by technology that allows legacy terminals to perform better. In particular, there is a need for an improved backhaul link for an AP-based solution in the high-speed train environment.

SUMMARY

It should be emphasized that the terms “comprises” and “comprising”, when used in this specification, are taken to specify the presence of stated features, integers, steps or components; but the use of these terms does not preclude the presence or addition of one or more other features, integers, steps, components or groups thereof.

Moreover, reference letters may be provided in some instances (e.g., in the claims and summary) to facilitate identification of various steps and/or elements. However, the use of reference letters is not intended to impute or suggest that the so-referenced steps and/or elements are to be performed or operated in any particular order.

In accordance with one aspect of the present invention, the foregoing and other objects are achieved in technology (e.g., methods, apparatuses, etc.) that controls reception and transmission from at least two sets of antenna ports in a high speed train, wherein the at least two sets of antenna ports are installed at different locations on the high speed train. This involves determining a velocity and a position of each of the at least two sets of antenna ports. The velocity and the position of each of the at least two sets of antenna ports are used as a basis for determining a reception combining and/or transmission scheme for the at least two sets of antenna ports. Signals are then transmitted and received from the at least two sets of antenna ports in conformance with the determined reception combining and/or transmission scheme.

In an aspect of some but not necessarily all embodiments consistent with the invention, determining the velocity and the position of each of the at least two sets of antenna ports comprises using information derived from satellite positioning system signals received at respective ones of the at least two sets of antenna ports to determine the velocity and the position of each of the at least two sets of antenna ports.

In an aspect of some but not necessarily all embodiments consistent with the invention, each of the sets of antenna ports is a pico base station.

In an aspect of some but not necessarily all embodiments consistent with the invention, each of the sets of antenna ports is a Remote Radio Head (RRH).

In an aspect of some but not necessarily all embodiments consistent with the invention, the controlling comprises using, as a further basis for determining the reception combining and/or transmission scheme for the at least two sets of antenna ports, metrics indicating at least one of:

- knowledge about a relative position of an antenna node of a telecommunication system;
- signal strength variation for reception from respective sets of antenna ports;
- estimates of Doppler shift experienced at respective sets of antenna ports;
- predictions of Doppler shift experienced at respective sets of antenna ports;
- automatic frequency control estimates for respective sets of antenna ports;
- automatic frequency control predictions for respective sets of antenna ports; and
- frequency estimate uncertainties for respective sets of antenna ports.

In an aspect of some but not necessarily all of such embodiments consistent with the invention, controlling comprises using all of the at least two sets of antenna ports for reception combining and/or transmission if differences between one or more respective metrics for the at least two sets of antenna ports are lower than a threshold value. In some but not necessarily all such embodiments, the respective threshold value is adapted based on type of cell deployment.

In some but not necessarily all alternative embodiments, the controlling comprises switching to use a first subset of the at least two sets of antenna ports for reception combining and/or transmission instead of a second subset of the at least two sets of antenna ports if one or more respective first metrics for the first subset of the at least two sets of antenna ports differ from one or more respective second metrics for the second subset of the at least two sets of antenna ports by a respective threshold value. In some but not necessarily all such embodiments, the respective threshold value is adapted based on type of cell deployment. In some but not necessarily all such embodiments, the first metrics and the second metrics relate to link quality.

In an aspect of some but not necessarily all embodiments consistent with the invention, the controlling comprises detecting that a first subset of the at least two antenna ports is about to enter a midpoint zone in which signals from at least two antenna nodes are received with Doppler shifts of opposite signs and at signal power levels that differ from one another by no more than a predetermined amount. In response to such detecting, controlling invokes switching to a reception scheme in which reliance on signals from the first subset of the at least two antenna ports is reduced In an aspect of some but not necessarily all embodiments consistent with the invention, the controlling comprises detecting that a first subset of the at least two antenna ports is about to enter an antenna node zone in which a Doppler shift of signals reaching the first subset of the at least two antenna ports will change sign within a predetermined amount of time. In response to such detecting, controlling invokes switching to a reception scheme in which reliance on signals from the first subset of the at least two antenna ports is reduced.

BRIEF DESCRIPTION OF THE DRAWINGS

The objects and advantages of the invention will be understood by reading the following detailed description in conjunction with the drawings in which.

DETAILED DESCRIPTION

Figure 1A:
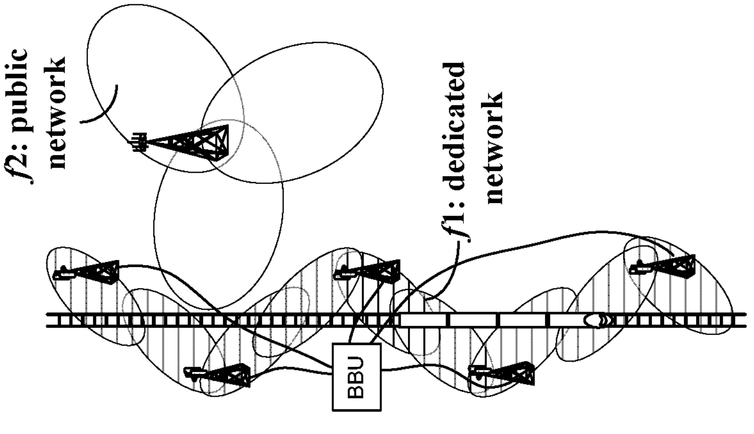
FIGS. 1A, 1B, 1C, and 1D illustrate exemplary communication network deployments for serving a high-speed train.
Figure 1B:
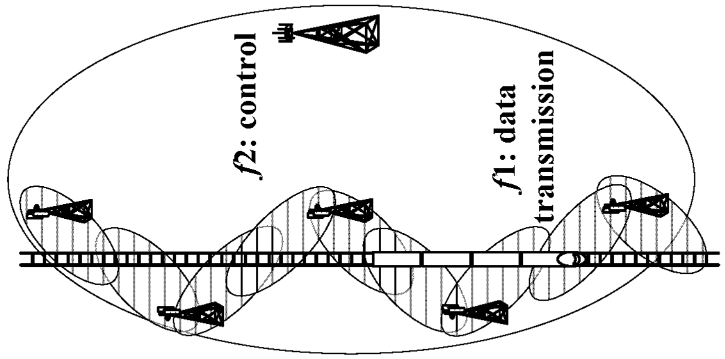
Figure 1C:
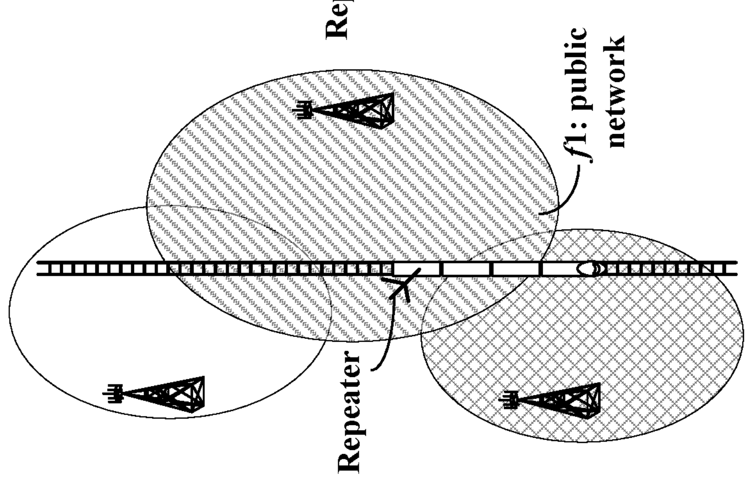
Figure 1D:
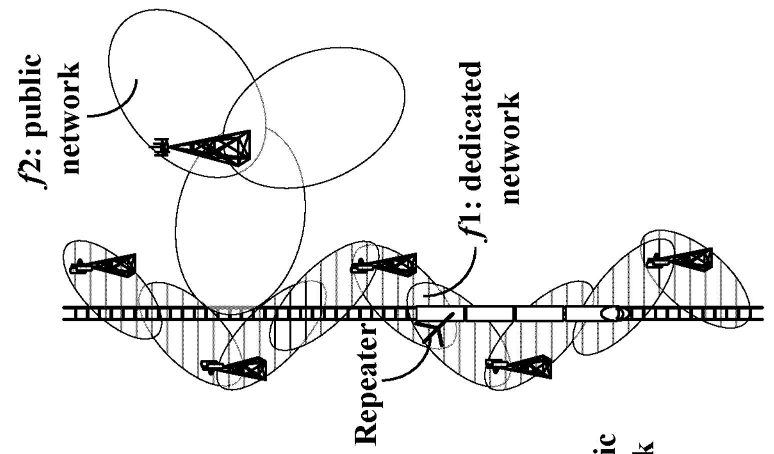

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits alone or in combination with one or more programmed processors). Moreover, the invention can additionally be considered to be embodied entirely within any form of nontransitory computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

With respect to terminology used herein, in some embodiments the non-limiting term UE is used. The UE herein can be any type of wireless device capable of communicating with a network node or another UE over radio signals. The UE may also be a radio communication device, target device, device to device UE, machine type UE or UE capable of machine to machine communication, a sensor equipped with UE, Tablet, mobile terminal, smart phone, laptop embedded equipment (LEE), laptop mounted equipment (LME), USB dongle, Customer Premises Equipment (CPE), and the like.

Also in some embodiments generic terminology, "radio network node" or simply "network node (NW node)", is used. This can be any kind of network node which may comprise any one or more of: a base station, a radio base station, a base transceiver station, a base station controller, a network controller, an evolved Node B (eNB), a Node B, a radio network controller (RNC), a relay node, a positioning node, an Evolved Serving Mobile Location Centre (E-SMLC), a location server, a repeater, an access point (AP), a radio access point, a Remote Radio Unit (RRU), a Remote Radio Head (RRH), a Remote Antenna Unit (RAU), a multi-standard radio (MSR) radio node such as MSR BS nodes in a distributed antenna system (DAS), a SON node, an Operations and Maintenance (O&M) node, an OSS, an MDT node, a Core network node, a Mobility Management Entity (MME), and the like.

In some embodiments, aspects utilized in Single Frequency Networks (SFNs) are employed. In an SFN, multiple network nodes transmit the same information on the same carrier frequency and use the same cell identity in an area that may be wider than a single node can cover. Although traditionally used in Long Term Evolution (LTE) deployments for multicast broadcast, the term has been extended in recent 5G studies conducted by the Third Generation Partnership Project (3GPP) to also include dedicated communication in a cell that may be managed by several network nodes in a cooperative manner, where the wireless communication device is aware only of being in a particular cell and not aware of which network node it is communicating with. An SFN may involve several eNodeBs.

In some embodiments, aspects involve the use of a combined cell, which is a cell comprising a network node with multiple antenna nodes, with fully or partially overlapping coverage. In its simplest form a combined cell corresponds to an SFN with the same information transmitted from all antenna nodes, and in more elaborate forms time and frequency resources may be reused for example, in spatial diversity multiplexing schemes. A combined cell may be a special case of an SFN with only one eNodeB managing the SFN cell.

For example, in some deployments a network node is connected to a plurality of antenna nodes that are located along a path (e.g., along a train track) along which a plurality of wireless communication devices are moving. The antenna nodes are controlled so as to maintain a respective radio cell, each cell having one and the same physical cell identity. Further, the antenna nodes are in an action controlled to maintain the respective radio cell in a single direction substantially along the path such that each wireless communication device, during movement in a movement direction along the path, can connect either to consecutive antenna nodes towards which the wireless communication device is moving or connect to consecutive antenna nodes away from which the wireless communication device is moving.

In such an arrangement, a plurality of cells are maintained, each being supported by a respective one of the antenna nodes, and can be considered as a "super-cell", where all cells within the super-cell share the same physical cell identity and configurations such that a UE can get handed over between the cells seamlessly and without the UE being aware of it.

A high-speed train car is, in general, 25 m in length, and most high-speed trains operate using sets of 8 to 16 cars and hence span 200 to 400 m from head to tail. This presents a unique opportunity to exploit large-scale antenna diversity to overcome fading and inter-carrier interference in particularly bidirectional SFN deployments. In this sense, "large-scale antenna diversity" means employing more antennas than necessary to minimally support a given number of Multiple Input Multiple Output (MIMO) layers. For example, a receiver capable of receiving 4 MIMO layers needs to have a minimum of 4 receiver antennas in a regular antenna diversity arrangement. In large scale antenna diversity, the same receiver needs to have a minimum of 8 receiver antennas, arranged in two spatially separated groups (sets) of 4 antennas.

Various embodiments consistent with the invention involve an AP that uses a first and at least a second set of receive antenna ports, wherein the first and at least second set of antenna ports are spatially distributed over the entire train set (for instance, and without limitation, one set at first car and the second antenna set at the last car). A control unit associated with the AP has information about the antenna positions (e.g., derived from satellite-based position information obtained for each antenna, satellite-based position information obtained for a satellite antenna installed on the train and information about relative positions of the antennas to the satellite antenna, etc.), velocity information, and in some embodiment also knowledge of serving cell (e.g., eNode B) position. Based on this information, the control unit can derive quite detailed knowledge of when reception from respective antenna sets may become troublesome due to, for example, Doppler shift. Hence, based on antenna position knowledge and high speed train velocity and position information (and in some embodiments also the signal quality, based on measurable signal characteristics such as, without limitation, Doppler spread, frequency offset statistics, and Signal-to-Interference-and-Noise Ratio—SINR) the AP then controls how the information received from the at least two sets of antennas will be combined (and in some embodiments, whether they will be combined). Examples of such "combining" include but are not limited to:

- Selection combining over sets of antenna ports,
- Weighted combining over sets of antenna ports,
- Soft (Chase) combining of redundancy versions received from the at least two sets of antenna ports,
- Selection of information from one of the sets of antenna ports after decoding the at least two replicas of the same redundancy version, Using multiple antenna sets increases the likelihood of at least one set experiencing favorable radio conditions when the train is passing an antenna node or when the train is passing the midpoint between two antenna nodes.

Various aspects of embodiments consistent with the invention will now be described in greater detail.

Figure 2:
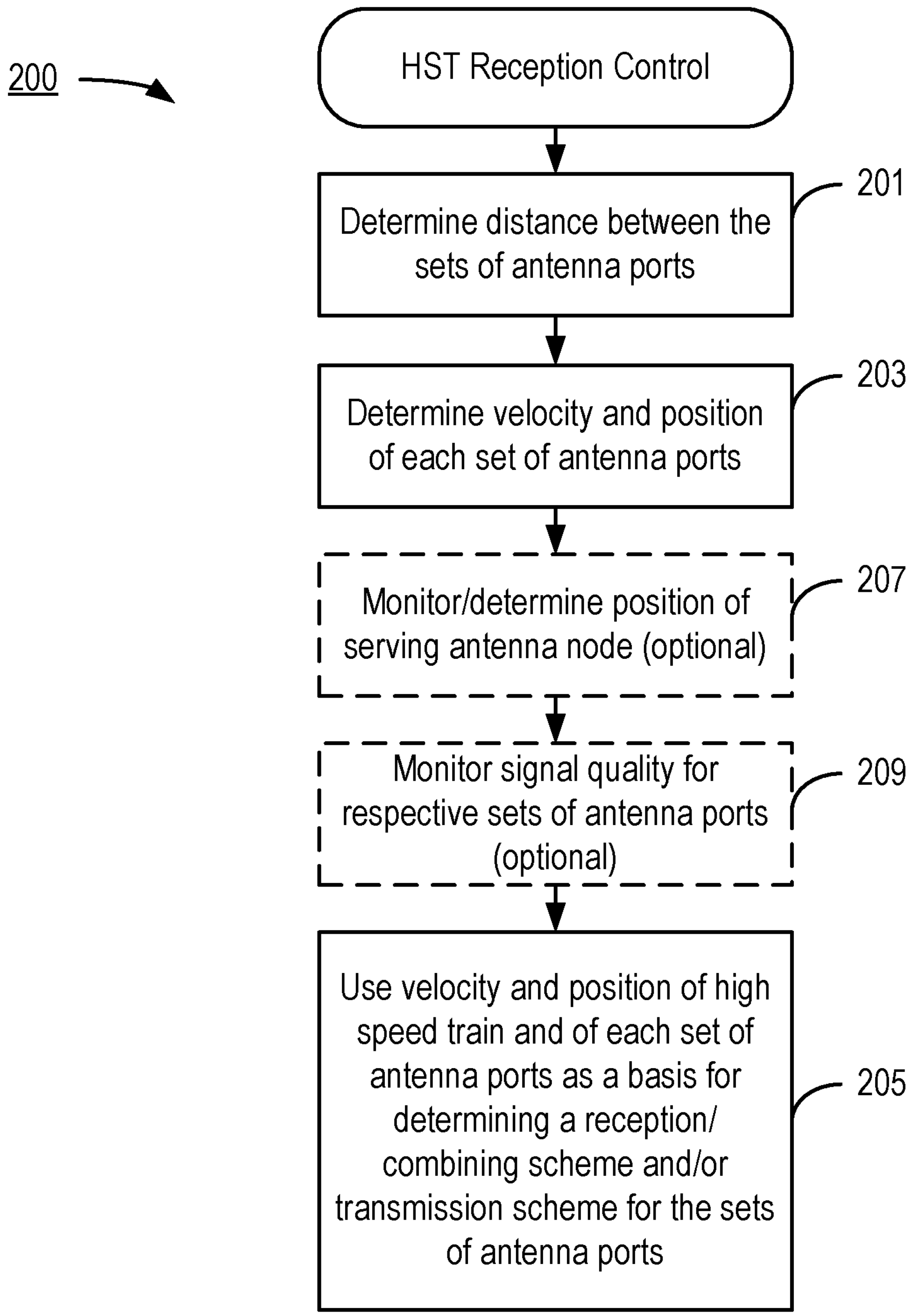
FIG. 2 is, in one respect, a flow chart of steps/processes performed by circuitry in accordance with some but not necessarily all exemplary embodiments consistent with the invention.

FIG. 2 is, in one respect, a flow chart of steps/processes performed by circuitry in accordance with some but not necessarily all exemplary embodiments consistent with the invention. In another respect, FIG. 2 can be considered to depict exemplary means 200 comprising the various illustrated circuitry (e.g., hard-wired and/or suitably programmed processor) configured to perform the described functions.

The functionality illustrated in FIG. 2 is performed by circuitry in a controller that is associated with an AP. In some embodiments, the controller is integrally a part of the AP. The functionality is that of controlling reception and/or transmission from at least two sets of antenna ports in a high speed train, wherein the at least two sets of antenna ports are installed at different locations on the high speed train. This involves determining a present distance between the at least two sets of antenna ports (step 201). If the train is expected to traverse a railway with only small bends (i.e., an essentially linear path) and/or if the train has very few cars, the distance between the various antenna ports can be considered static, in which case it can be determined once and stored by the controller (i.e., "determining the present distance" comprises retrieving the previously determined value from a memory unit). In some but not necessarily all of such embodiments, the determination of distance is made using external information about the high-speed train length (number of cars multiplied by the car length). This information may be received "over the top", that is, via an application that runs on top of a communication protocol stack (e.g., on Open System Interconnect—OSI—layers above those that are used for RAN signaling).

Figure 3A:
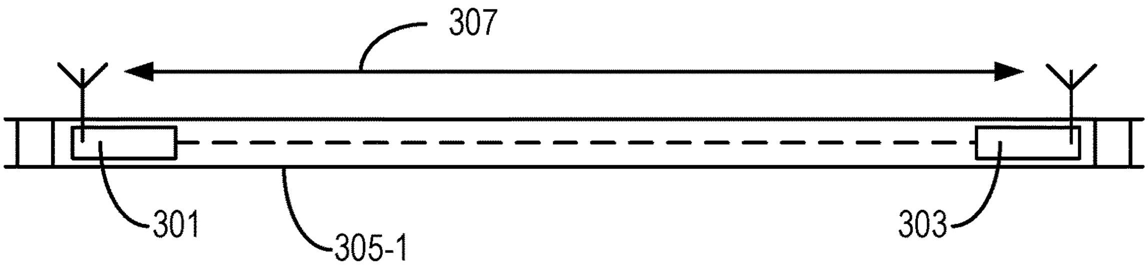
FIGS. 3A and 3B depict a front car and a rear car of a high speed train situated on respectively different portions of a track.
Figure 3B:
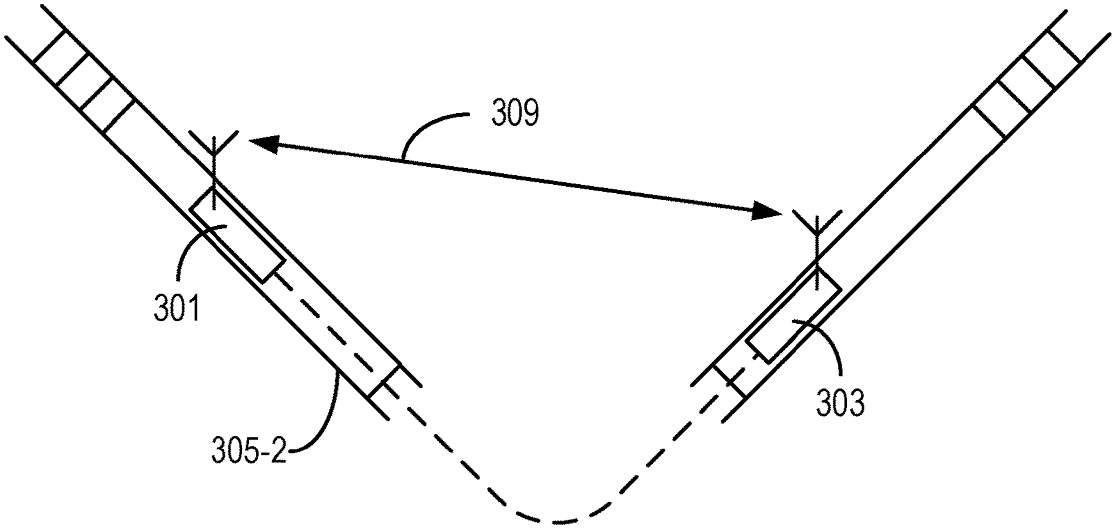

It can be seen that the distance between the antenna ports can, in some embodiments, be determined once and stored (e.g., in nontransitory processor-readable memory) for later retrieval whenever the information is needed. But if the train has many cars (e.g., 8 to 16 cars, spanning 200 to 400 m from head to tail) and if the railway path includes bends, the distance between antennas can vary enough that it can, in some but not necessarily all embodiments, be beneficial to dynamically determine the distance whenever it is needed, for example by deriving position information from global satellite navigation system (e.g., GPS) receivers co-located with each set of antenna ports. This point is illustrated in FIGS. 3A and 3B, which depict a front car 301 and a rear car 303 of a high speed train situated on respectively different portions of a track 305-1, 305-2. (The track portions are not drawn to scale, but are exaggerated to better illustrate the point.) In FIG. 3A, the train is situated on a straight stretch of track 305-5, so the distance 307 between antennas located in the front and rear cars 301, 303 is at its maximum (in this example, substantially corresponding to the length of the train). By comparison, FIG. 3B shows when the train is rounding a bend on a different portion of the track 305-2. The front car 301 has already made the turn but the rear car is still approaching it. Therefore, the straight line distance 309 between the two antennas is shorter than the maximum distance 307.

Returning now to FIG. 2, the functionality further includes determining a velocity and a position of each of the at least two sets of antenna ports (step 203). Here too, velocity and position can be derived from information obtained from a navigation system receiver (e.g., GPS receiver). In embodiments that assume a fixed distance between the sets of antenna ports, all of these values can be derived from velocity and position information determined at a known location on the train (e.g., the location of the AP). However, in other embodiments, the AP and the sets of antenna ports can each have its own navigation system receiver, thereby enabling accurate determination of velocity and position of each relevant position (e.g., as illustrated in FIG. 3B, the velocities of the front and rear cars differ at least because they are travelling in different directions as the train makes its turn).

The velocity and position of each of the at least two sets of antenna ports are then used as a basis for determining a reception combining scheme and/or a transmission scheme for the at least two sets of antenna ports (step 205).

Then, signals are transmitted and/or received between the at least two sets of antenna ports and a serving cell of a telecommunication system in conformance with the determined reception combining scheme and/or transmission scheme (step 205).

In some optional aspects of embodiments consistent with the invention, the control unit also determines/monitors the position of its serving antenna node (step 207). Once the serving cell Global cell ID is known, the AP's control unit can determine (e.g., from a database) the cell/base station/antenna node position. The database may, in some embodiments, also include information about the current deployment, for instance indicating which of the four example deployments (see FIGS. 1A, 1B, 1C, and 1D) are currently being used. All this information then can be used to predict when reception from some of the antenna sets (installed on the train) may become worse and hence adaptation of antenna combining scheme may be needed.

In other optional aspects of some but not necessarily all embodiments consistent with the invention, the AP also monitors the signal quality for respective sets of antenna ports (e.g., Doppler spread, frequency offset statistics, SINR, etc.) (step 209). Then the control unit associated with the AP uses this information in addition to the earlier-mentioned information to determine the best antenna set combining method for reception as well as in some embodiments the transmission.

In still further aspects of some but not necessarily all embodiments, different combining approaches and adaptation principles are based on different deployment and radio channel scenarios. These are now described.

One aspect relates to determining which antenna set to use (antenna selection). Detection and determination of which antenna set to use may be carried out in several ways, separately or in combination. For instance, one may have one source of information and fully base the decision on that source. Alternatively, one can have multiple sources, and base the antenna selection decision on majority voting, where in some embodiments some sources are given more votes than other. Sources of relevant information include one or more of:

- GPS receiver and set of coordinates at which to switch the antenna set in use
- Onboard train control system identifying the location of the train along the track and a set of positions at which to switch the antenna set being used
- Carrier State Information (CSI) estimation from both antenna sets, and one or more criteria for when to switch from one set of antenna ports to another;
  - Selection based on highest rank, highest CQI, or a combination thereof
- Frequency offset estimation from the several sets of antenna ports, and one or more criteria for when to switch from one set to another;
  - Switch to another set of antenna ports when another antenna set is displaying lower variability than the one presently being used
- Doppler shift estimation from both antenna sets, and one or more criteria for when to switch
  - Switch to the antenna set that consistently shows a lower Doppler spread (in practice meaning that one of the two signal paths is dominating over the other)
- SINR estimation and one or more criteria for when to switch from one antenna set to another other
  - Switch when a measured SINR is consistently more favorable for an antenna set than for the one presently being used
- Obtain signal power measurements in each direction (using beamforming), and switch to a front antenna set when the forward direction becomes consistently stronger than the rear direction.
- Other positioning methods Examples of the metrics that can be exploited and a showing of why they are useful, are provided in the following figures.

Figure 4:
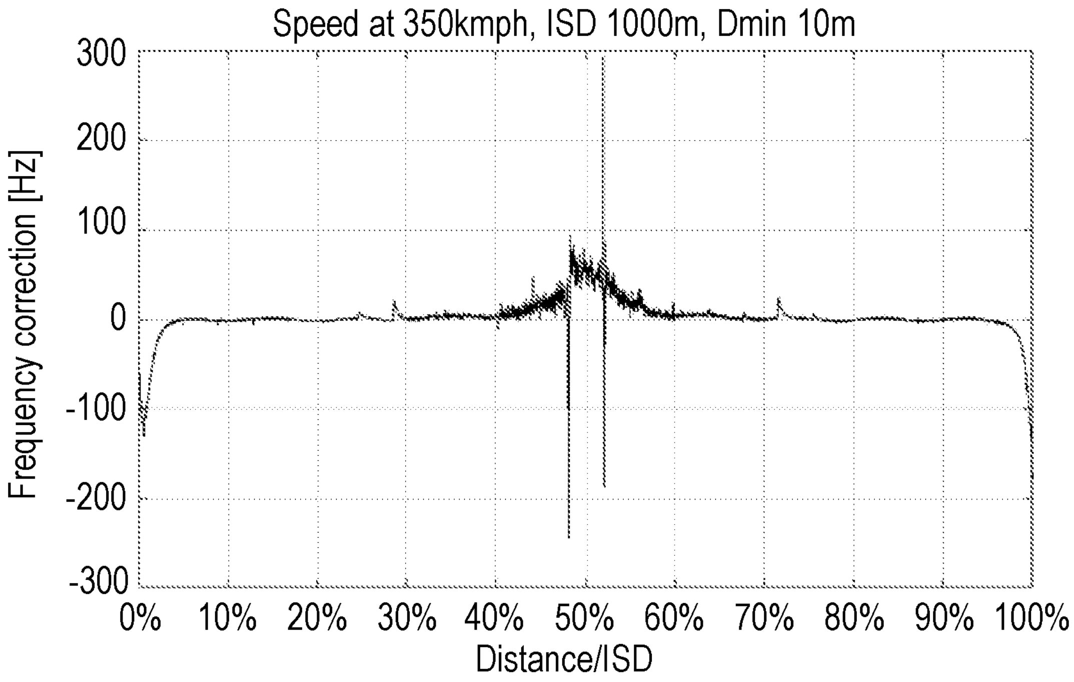
FIG. 4 illustrates how the variability of the frequency offset estimate increases when a UE travelling at 350 km/h enters the difficult zone between the antenna nodes.

FIG. 4 illustrates how the variability of the frequency offset estimate increases when a UE travelling at 350 km/h enters the difficult zone between the antenna nodes. In this example, frequency correction is applied on a subframe basis by a legacy UE operating in Bidirectional SFN at 2.7 GHz. The UE speed is 350 kmph; Inter-Site Distance (ISD) is 1000 m; the minimum distance between track and antenna node is 10 m; and the SNR is 20 dB when closest to the antenna node. At this UE speed, the UE achieves about 60% of the maximum downlink throughput. The antenna nodes are located at 0% and 100% ISD distance, respectively.

Figure 5:
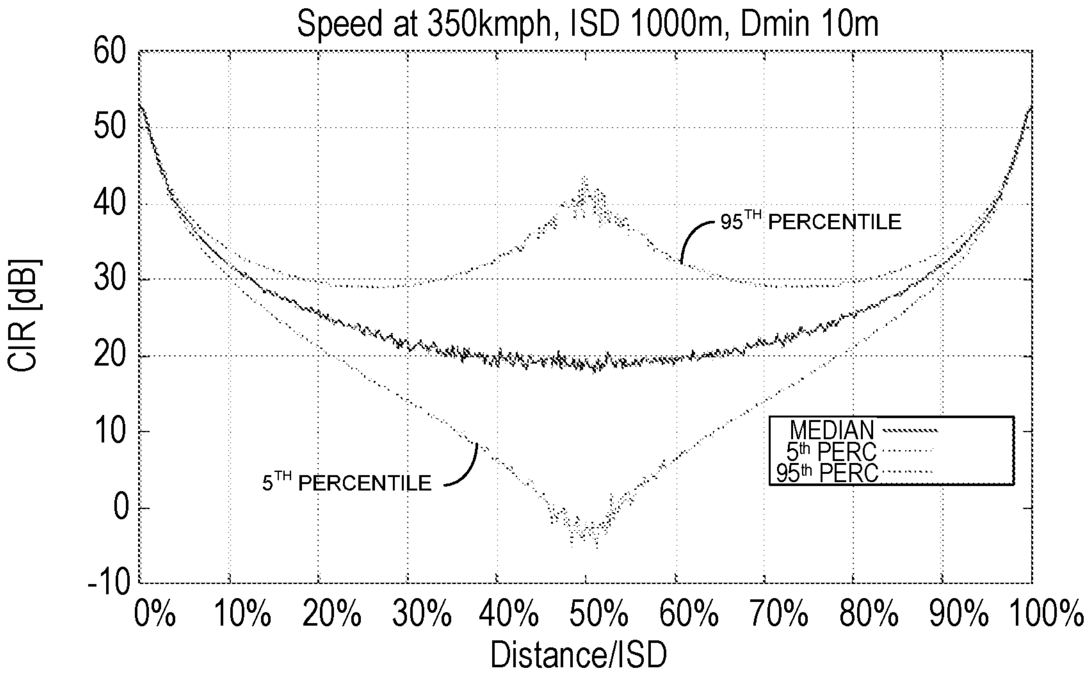
FIG. 5 illustrates how the median SIR and the variability of SIR estimates change with UE position, and shows the median SIR decreasing and the variability increasing in the difficult zone between the antenna nodes.

FIG. 5 illustrates how the median SIR and the variability of SIR estimates change with UE position, and shows the median SIR decreasing and the variability increasing in the difficult zone between the antenna nodes. In this example, the Carrier-to-Interference Ratio for a legacy UE travelling at a speed of 350 kmph is shown for conditions in which inter-site distance is 1000 m, minimum distance between antenna node and track is 10 m, and infinite SNR (no noise added).

Figure 6:
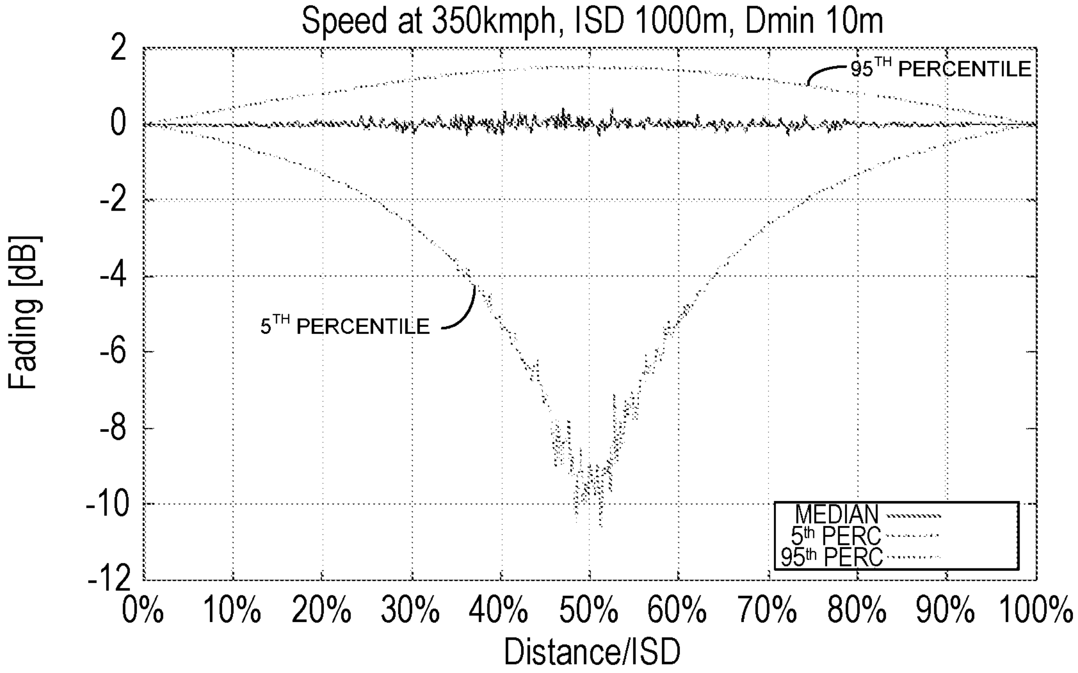
FIG. 6 illustrates how the variability of the received signal power, caused by small-scale fading, increases when the UE enters the difficult zone between the antenna nodes.

FIG. 6 illustrates how the variability of the received signal power, caused by small-scale fading, increases when the UE enters the difficult zone between the antenna nodes. In particular, the figure shows Net fading (path loss removed) for a legacy UE moving at a speed of 350 kmph in an environment having an inter-site distance of 1000 m, a minimum distance between antenna node and track of 10 m, and an infinite SNR (no noise added).

In other aspects of some but not necessarily all embodiments consistent with the invention, selection of a suitable combination method depends on what the network scenario is. For example, in a distant macro cell deployment, it may be feasible to combine the inputs from the several sets of antenna ports because all antennas experience the same Doppler shift, whereas in a bidirectional SFN scenario with antenna nodes along the track, selection from among the sets of the train's antenna ports may be more feasible because the noise and interference characteristics will differ.

Figure 7:
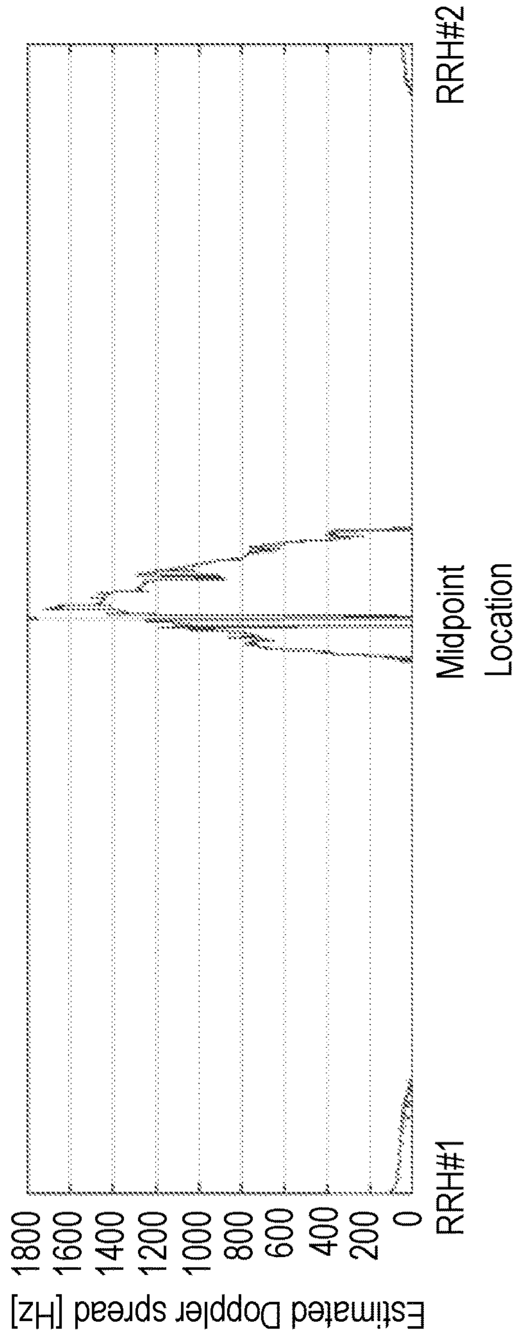
FIG. 7 illustrates estimated Doppler spread for a UE travelling from a first antenna node to a second antenna node at 350 km/h.
Figure 8:
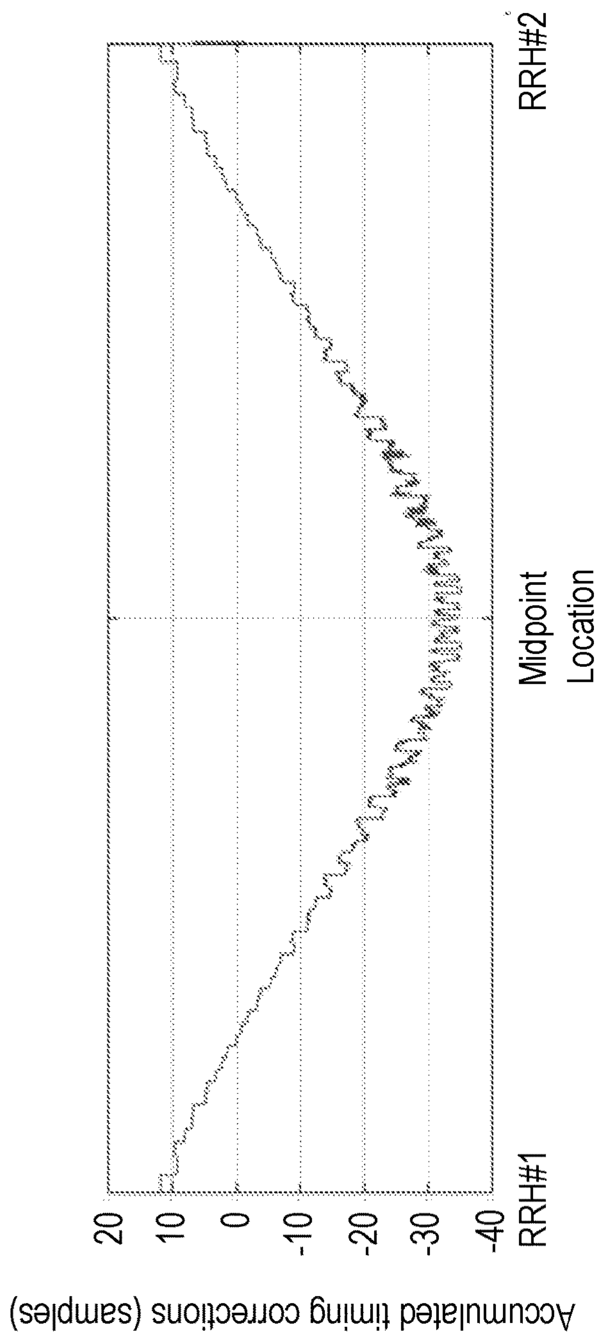
FIG. 8 illustrates accumulated timing corrections for a UE travelling from a first antenna node to a second antenna node at 350 km/h.

Alternatively, data from the several sets of antenna ports can be soft-combined before the decoding, with differing weights being applied to the contribution from each set of antenna ports. The weights in such embodiments can be based on, for example:

- Relative variability of any or a combination of the parameters above.
- Relative level of any or a combination of the parameters above In another aspect of some but not necessarily all embodiments consistent with the invention, the network scenario being used can be detected by analyzing the parameters above. For instance, the bidirectional SFN scenario results in a characteristic Doppler spread midway between antenna nodes, which can be detected either directly or in combination with other metrics. Other options include detecting that the cell timing appears to be jittering. Doppler spread is illustrated in FIG. 7, and cell timing jittering is illustrated in FIG. 8. In FIG. 7, Doppler spread is estimated for a UE travelling from a first antenna node to a second antenna node at 350 km/h. In FIG. 8, accumulated timing corrections are estimated for a UE travelling between a first antenna node and a second antenna node at 350 km/h.

Further considering FIGS. 4 through 8, FIG. 4 shows the frequency corrections that a UE applies while travelling at constant speed between two antenna nodes. Midway between the antenna nodes, the signals from the two antenna nodes have equal strength but opposite Doppler shift. The UE receives both signals simultaneously and experiences inter-carrier interference which is manifested by increasing variability of the carrier-to-interference ratio, as shown in FIG. 5, and by increased Doppler spread as shown in FIG. 7. Moreover in this zone around the midpoint, the UE additionally experiences significant so-called small-scale fading as illustrated in FIG. 6. The fading arises from the UE receiving the same signal from both directions and hence with different Doppler shifts. The phases change as a function of the UE's position. In the midpoint zone between the antenna nodes, where both signals are of the same magnitude, certain phase differences between them result in annihilation such that the signal received from one direction cancels the signal received from the other direction at the UE antenna. Furthermore, as shown in FIG. 8, the path delay tracking (cell timing tracking) displays an increased variability in the midpoint zone. The increased variability, stemming from the lower carrier-to-interference ratio and the small-scale fading, impacts the performance of the data demodulation. From the information presented in FIG. 4 through FIG. 8, it is clear that the zone around the midpoint poses a challenge to the UE (and likewise to an AP).

Figure 9:
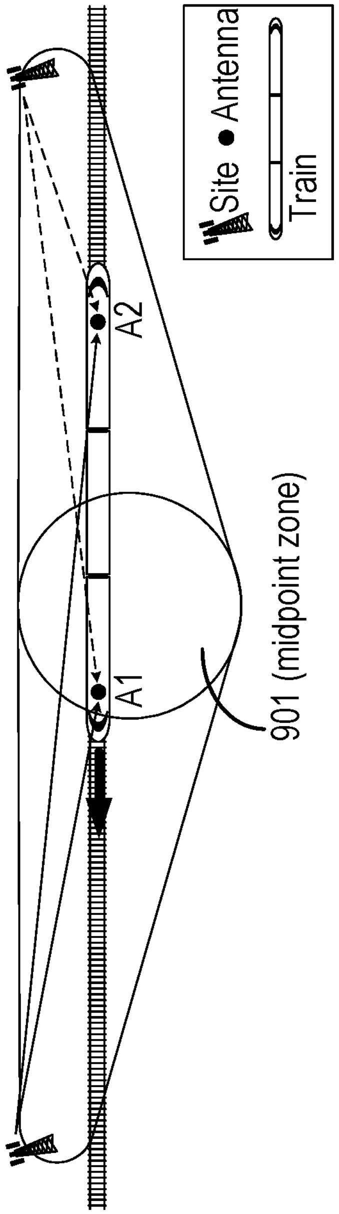
FIG. 9 illustrates a train that is midway between two antenna nodes.

To further illustrate other aspects of embodiments consistent with the invention, FIG. 9 illustrates a train that is approximately at a midpoint between two antenna nodes. The train's set of antenna ports A1 ("group A1") experiences significant small-scale fading and interference as described above due to its receiving equally strong signals from both antenna nodes simultaneously, and the respective Doppler shifts having opposite signs. By comparison, the set of antenna set A2 ("group A2"), which is outside the midpoint zone 901, mainly receives one dominating signal (in this example, from antenna group A2) having a negative Doppler shift.

This situation can be dealt with by, for example, switching reception to a single link operation that receives signals from a best antenna group. It is desirable to receive signals from the antenna group that displays the highest carrier-to-interference ratio and the least fading. Therefore, when antenna group A1 enters the midpoint zone, the AP responds by switching reception to use only antenna group A2 instead, and vice versa. The switching points can be based on geographical coordinates and/or signal quality measurements.

Figure 10:
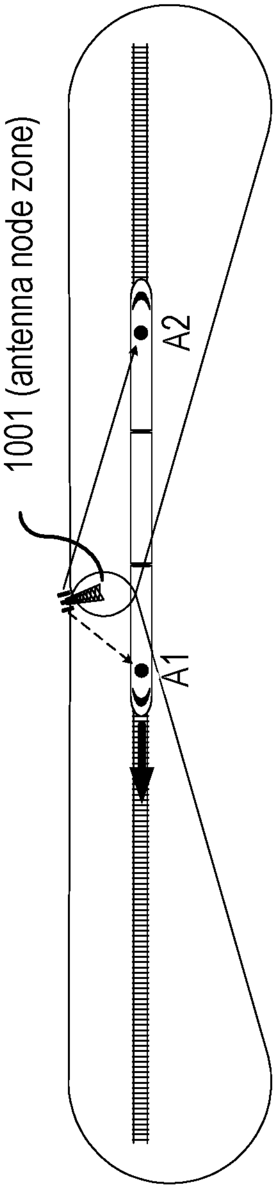
FIG. 10 illustrates another situation in which a train passes an antenna node.

FIG. 10 illustrates another situation in which a train has just passed an antenna node. At this point, antenna group A1 experiences a negative Doppler shift and antenna group A2 a positive Doppler shift. But consider what happens at the moment of passing the antenna node: When an antenna group, e.g. A1, is passing through an antenna node zone 1001 (i.e., a region relatively close to the antenna node), there will be a sign-change of Doppler shift. During this rapid change of the Doppler shift the downlink performance degrades. In another aspect of some but not necessarily all embodiments, immediately before the antenna group A1 passes the antenna node (e.g., when it is determined that the antenna group A1 will experience a change in sign of Doppler shift within a predetermined amount of time), the AP responds by, for example, switching to reception from antenna group A2 instead. That way, the receiver does not have to deal with the abrupt change in Doppler shift. Similarly, when antenna group A2 is about to pass the antenna node, the AP responds by switching back to reception via antenna group A1 again.

Further, after antenna group A2 has passed the antenna node and before antenna group A1 has entered the midpoint zone, the AP may, if reception conditions warrant, receive from both antenna groups (i.e., both single link and dual link scenarios can be considered). Although the term "switch" is used here, it may be implemented as a weighting of the inputs from both antenna groups.

It will further be appreciated that in some other embodiments, the "switching" does not result in using only antenna group A2 instead antenna group A1. Instead, "switching" can involve turning off, weighting down, or excluding the information from the affected antenna port(s).

Moreover, the examples illustrated in FIGS. 9 and 10 depict embodiments having only two different sets of antenna ports (A1 and A2). But in other embodiments, more than two sets of antenna ports can be configured to operate together, with the different sets of antenna ports being located at different places on the train. Thus, even if one set of antenna ports is completely turned off, there may still be a plurality of differently located antenna ports that can be relied on in a diversity combining reception scheme.

Accordingly, the principles identified above with respect to FIGS. 9 and 10 can more generally considered to involve detecting that performance associated with one or more (but not all) of the installed antenna ports is about to deteriorate due to relative location of the antenna ports with respect to an antenna node, and in response to this detection switching to a reception scheme in which reliance on signals from the first subset of the at least two antenna ports is reduced (including but not limited to turning off the affected antenna port(s) entirely). Single link operation is but one example of such a reception scheme. Others include weighting down the affected antenna's contribution in a diversity combining scheme, disregarding information from the affected antenna port(s), and so on.

Moreover, with regard to the antenna switching described with reference to FIGS. 9 and 10, the designer should be mindful that when antenna group A1 is positioned in the midpoint zone, antenna group A2 should not be positioned in a zone near the antenna node, and vice versa, as this would mean switching from one problematic zone to another. In other words, in the illustrated examples, the common inter-site distance (e.g., 1000 m) is assumed to be sufficiently larger than the train length (e.g., about 200 to 400 m), so that the two types of problematic zones are not present at the same time.

Further regarding antenna switching (e.g., deciding to switch to use a first subset of antenna ports, such as antenna group A1, instead of using a second subset of antenna ports, such as antenna group A2), metrics characterizing the two subsets can be compared, and if their difference exceeds a threshold value, then the switch is made. The metrics and threshold may be based on characteristics related to link quality such as, but not limited to, measurements of signal strength, signal quality and/or signal to noise ratio measurements on reference signals or other prior known or predictable signals or channels; decoder-related measurements such as decoding the same message over both links and comparing for instance the bit error rate and/or the number of turbo decoder iterations needed; and/or measurements of the Doppler shift over each of the links.

Figure 11:
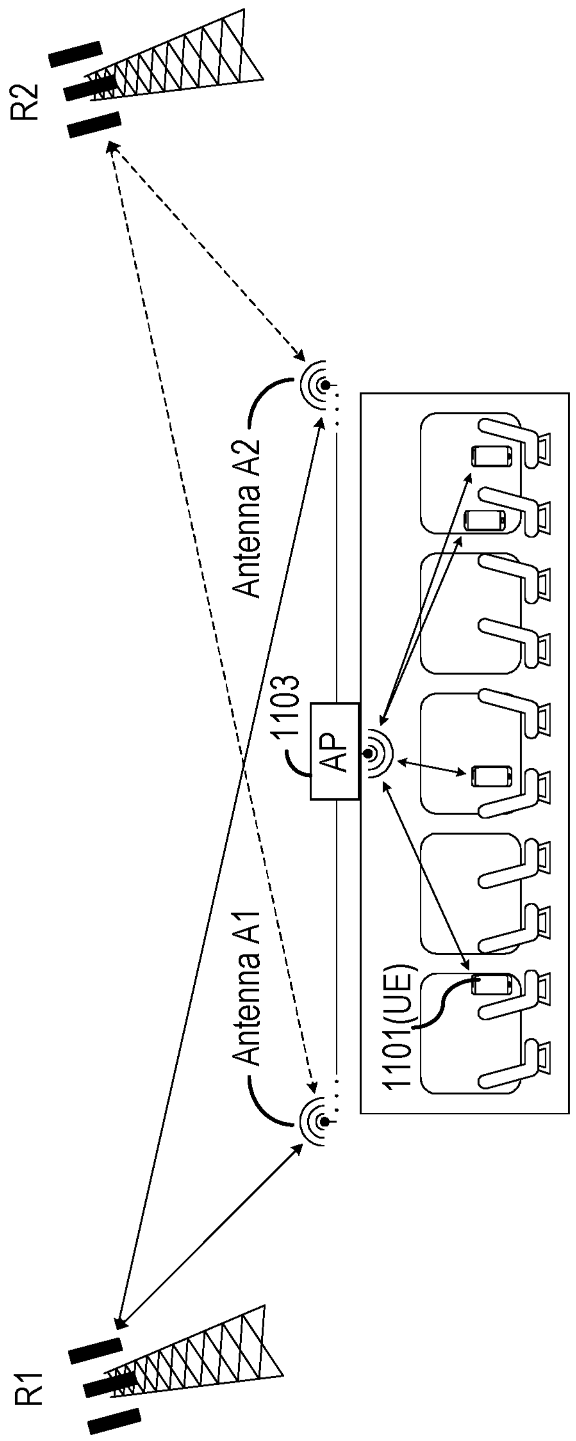
FIG. 11 further illustrates a deployment of an exemplary embodiment consistent with the invention.

FIG. 11 further illustrates a deployment of an exemplary embodiment consistent with the invention. UEs (e.g., UE 1101) that are onboard the train communicate with an Access Point 1103 which may constitute, for example, a pico cell or a WiFi hotspot. The AP 1103 establishes a backhaul to the Radio Access Network where it uses two sets of antenna ports: A1 and A2. Particularly the embodiment involves the use of multiple (redundant) sets of antenna ports for improving the backhaul capacity.

Figure 12:
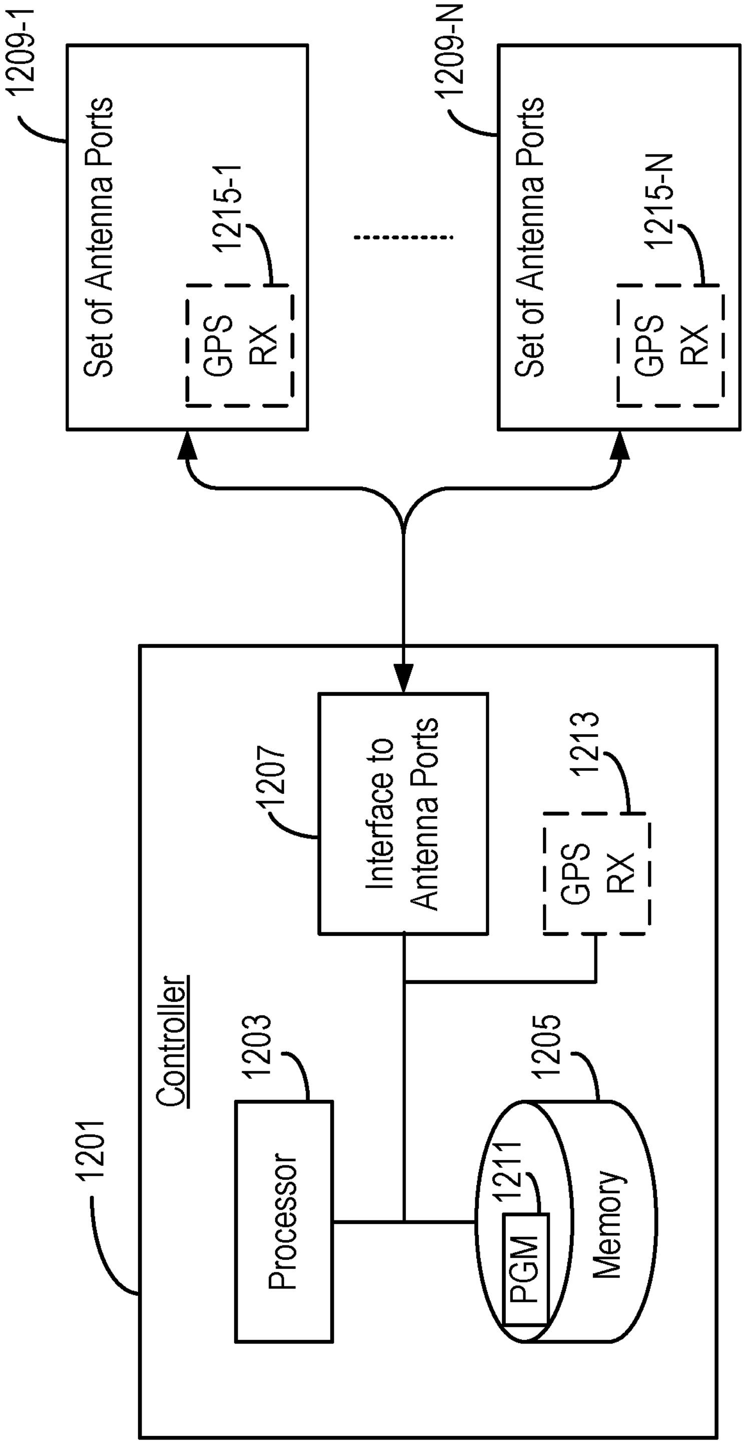
FIG. 12 is a block diagram of elements for carrying out various aspects of the invention as described above, such as in connection with FIGS. 2 through 11.

Looking at further aspects of embodiments consistent with the invention, FIG. 12 is a block diagram of elements for carrying out various aspects of the invention as described above, such as in connection with FIGS. 2 through 11. In particular, a controller 1201 associated with an AP includes circuitry configured to carry out any one or any combination of the various functions described above. Such circuitry could, for example, be entirely hard-wired circuitry (e.g., one or more Application Specific Integrated Circuits—"ASICs"). Depicted in the exemplary embodiment of FIG. 12, however, is programmable circuitry, comprising a processor 1203 coupled to one or more memory devices 1205 (e.g., Random Access Memory, Magnetic Disc Drives, Optical Disk Drives, Read Only Memory, etc.) and to an interface 1207 to N sets of antenna ports 1209-1, . . . , 1209-N that are installed at different locations on the high-speed train. The interface 1207 enables bidirectional communication with each of the sets of antenna ports 1209-1, . . . , 1209-N. The memory device(s) 1205 store program means 1211 (e.g., a set of processor instructions) configured to cause the processor 1203 to control other node elements so as to carry out any of the aspects described above, such as but not limited to those described with reference to FIGS. 2 through 11. The memory device(s) 1205 may also store data (not shown) representing various constant and variable parameters as may be needed by the processor 1203 and/or as may be generated when carrying out its functions such as those specified by the program means 1211.

Also illustrated are optional satellite navigation system receivers 1213 and 1215-1 through 1215-N that enable dynamic determination of position of the AP Controller 1201 and of each set of antenna ports 1209-1, . . . , 1209-N, respectively.

It can be seen that the technology described herein is able to utilize large-scale antenna diversity in a high-speed train to increase the likelihood of the signal being received in favorable radio conditions by at least one set of antenna ports. As a result, the backhaul performance and therefore also the system capacity improves in zones that otherwise would be challenging (e.g., midway between antenna nodes, when passing an antenna node, etc.).

The inventive principles described herein work independently of whether a UE is a legacy terminal or a terminal with a high-speed enabled receiver. Hence the operator's ability to improve system capacity is not dependent on the end-user's equipment being brought up-to-date.

The invention has been described with reference to particular embodiments. However, it will be readily apparent to those skilled in the art that it is possible to embody the invention in specific forms other than those of the embodiment described above. Thus, the described embodiments are merely illustrative and should not be considered restrictive in any way. The scope of the invention is further illustrated by the appended claims, rather than only by the preceding description, and all variations and equivalents which fall within the range of the claims are intended to be embraced therein.

What is claimed is:

1. A method of controlling reception and/or transmission from at least two sets of antenna ports on a high speed train, wherein the at least two sets of antenna ports are installed at different locations on the high speed train, the method comprising:

determining a velocity and a position of each of the at least two sets of antenna ports;

using the velocity and the position of each of the at least two sets of antenna ports as a basis for initially selecting a reception combining scheme and/or a transmission scheme for the at least two sets of antenna ports;

transmitting and/or receiving signals from the at least two sets of antenna ports in conformance with the selected reception combining scheme and/or transmission scheme;

detecting, based on a subsequently determined velocity and a subsequently determined position of each of the at least two sets of antenna ports, that a first set of the at least two sets of antenna ports is about to enter an antenna node zone selected from a group comprising:

a midpoint zone in which signals from at least two antenna nodes of the telecommunication system are received with Doppler shifts of opposite signs and at signal power levels that differ from one another by no more than a predetermined amount; and a zone in which a Doppler shift of signals reaching the first set of the at least two sets of antenna ports will change sign within a predetermined amount of time; and before entering the detected antenna node zone, responding to the detecting by switching to a reception combining scheme and/or transmission scheme in which reliance on signals from the first set of the at least two sets of antenna ports is reduced.

2. The method of claim 1, wherein determining the velocity and the position of each of the at least two sets of antenna ports comprises:

using information derived from satellite positioning system signals received at respective ones of the at least two sets of antenna ports to determine the velocity and the position of each of the at least two sets of antenna ports.

3. The method of claim 1, comprising:

using, as a further basis for selecting the reception combining scheme and/or transmission scheme for the at least two sets of antenna ports, metrics indicating at least one of:

knowledge about a relative position of an antenna node of a telecommunication system;

signal strength variation for reception from respective sets of antenna ports;

estimates of Doppler shift experienced at respective sets of antenna ports;

predictions of Doppler shift experienced at respective sets of antenna ports;

automatic frequency control estimates for respective sets of antenna ports;

automatic frequency control predictions for respective sets of antenna ports; and frequency estimate uncertainties for respective sets of antenna ports.

4. The method of claim 3, comprising:

using all of the at least two sets of antenna ports for reception combining and/or transmission if differences between one or more respective metrics for the at least two sets of antenna ports are lower than a respective threshold value.

5. The method of claim 4, wherein the respective threshold value is adapted based on type of cell deployment.

6. The method of claim 3, comprising:

switching to use a first set of the at least two sets of antenna ports for reception combining and/or transmission instead of a second set of the at least two sets of antenna ports if one or more respective first metrics for the first set of the at least two sets of antenna ports differ from one or more respective second metrics for the second set of the at least two sets of antenna ports by a respective threshold value.

7. The method of claim 6, wherein the respective threshold value is adapted based on type of cell deployment.

8. The method of claim 6, wherein the first metrics and the second metrics relate to link quality.

9. The method of claim 1, wherein:

the detected antenna node zone is the midpoint zone in which signals from at least two antenna nodes of the telecommunication system are received with Doppler shifts of opposite signs and at signal power levels that differ from one another by no more than a predetermined amount.

10. The method of claim 1, wherein:

the detected antenna node zone is the zone in which a Doppler shift of signals reaching the first set of the at least two sets of antenna ports will change sign within a predetermined amount of time.

11. A controller for controlling reception and/or transmission from at least two sets of antenna ports in a high speed train, wherein the at least two sets of antenna ports are installed at different locations on the high speed train, the controller comprising:

circuitry configured to determine a velocity and a position of each of the at least two sets of antenna ports;

circuitry configured to use the velocity and the position of each of the at least two sets of antenna ports as a basis for initially selecting a reception combining scheme and/or a transmission scheme for the at least two sets of antenna ports;

circuitry configured to cause the at least two sets of antenna ports to transmit and/or receive signals in conformance with the selected reception combining scheme and/or transmission scheme;

circuitry configured to detect, based on a subsequently determined velocity and a subsequently determined position of each of the at least two sets of antenna ports, that a first set of the at least two sets of antenna ports is about to enter an antenna node zone selected from a group comprising:

a midpoint zone in which signals from at least two antenna nodes of the telecommunication system are received with Doppler shifts of opposite signs and at signal power levels that differ from one another by no more than a predetermined amount; and a zone in which a Doppler shift of signals reaching the first set of the at least two sets of antenna ports will change sign within a predetermined amount of time; and circuitry configured to respond to the detecting by, before entering the detected antenna node zone, switching to a reception combining scheme and/or transmission scheme in which reliance on signals from the first set of the at least two sets of antenna ports is reduced.

12. The controller of claim 11, wherein the circuitry configured to determine the velocity and the position of each of the at least two sets of antenna ports comprises:

circuitry configured to use information derived from satellite positioning system signals received at respective ones of the at least two sets of antenna ports to determine the velocity and the position of each of the at least two sets of antenna ports.

13. The controller of claim 11, comprising:

circuitry configured to use, as a further basis for selecting the reception combining and/or transmission scheme for the at least two sets of antenna ports, metrics indicating at least one of:

knowledge about a relative position of an antenna node of a telecommunication system;

signal strength variation for reception from respective sets of antenna ports;

estimates of Doppler shift experienced at respective sets of antenna ports;

predictions of Doppler shift experienced at respective sets of antenna ports;

automatic frequency control estimates for respective sets of antenna ports;

automatic frequency control predictions for respective sets of antenna ports; and frequency estimate uncertainties for respective sets of antenna ports.

14. The controller of claim 13, comprising:

circuitry configured to use all of the at least two sets of antenna ports for reception combining and/or transmission if differences between one or more respective metrics for the at least two sets of antenna ports are lower than a threshold value.

15. The controller of claim 14, wherein the respective threshold value is adapted based on type of cell deployment.

16. The controller of claim 13, comprising:

circuitry configured to switch to use a first set of the at least two sets of antenna ports for reception combining and/or transmission instead of a second set of the at least two sets of antenna ports if one or more respective first metrics for the first set of the at least two sets of antenna ports differ from one or more respective second metrics for the second set of the at least two sets of antenna ports by a respective threshold value.

17. The controller of claim 16, wherein the respective threshold value is adapted based on type of cell deployment.

18. The controller of claim 16, wherein the first metrics and the second metrics relate to link quality.

19. The controller of claim 11, wherein:

the detected antenna node zone is the midpoint zone in which signals from at least two antenna nodes of the telecommunication system are received with Doppler shifts of opposite signs and at signal power levels that differ from one another by no more than a predetermined amount.

20. The controller of claim 11, wherein:

the detected antenna node zone is the zone in which a Doppler shift of signals reaching the first set of the at least two sets of antenna ports will change sign within a predetermined amount of time.

21. A nontransitory computer readable storage medium comprising program instructions that, when executed by one or more processors, performs a method of controlling reception and/or transmission from at least two sets of antenna ports in a high speed train, wherein the at least two sets of antenna ports are installed at different locations on the high speed train, the method comprising:

determining a velocity and a position of each of the at least two sets of antenna ports;

using the velocity and the position of each of the at least two sets of antenna ports as a basis for initially selecting a reception combining and/or transmission scheme for the at least two sets of antenna ports; and transmitting and/or receiving signals from the at least two sets of antenna ports in conformance with the selected reception combining and/or transmission scheme;

detecting, based on a subsequently determined velocity and a subsequently determined position of each of the at least two sets of antenna ports, that a first set of the at least two sets of antenna ports is about to enter an antenna node zone selected from a group comprising:

a midpoint zone in which signals from at least two antenna nodes of the telecommunication system are received with Doppler shifts of opposite signs and at signal power levels that differ from one another by no more than a predetermined amount; and a zone in which a Doppler shift of signals reaching the first set of the at least two sets of antenna ports will change sign within a predetermined amount of time; and before entering the detected antenna node zone, responding to the detecting by switching to a reception combining scheme and/or transmission scheme in which reliance on signals from the first set of the at least two sets of antenna ports is reduced.

* * * * *